United States Patent
You et al.

(10) Patent No.: US 11,327,617 B2
(45) Date of Patent: May 10, 2022

(54) TOUCH CONTROL MODULE AND FABRICATING METHOD THEREOF AND TOUCH CONTROL DISPLAY APPARATUS

(71) Applicant: BOE TECHNOLOGY GROUP CO., LTD., Beijing (CN)

(72) Inventors: Jaegeon You, Beijing (CN); Jikai Yao, Beijing (CN); Xinxing Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 677 days.

(21) Appl. No.: 16/301,573

(22) PCT Filed: Apr. 24, 2018

(86) PCT No.: PCT/CN2018/084239
§ 371 (c)(1),
(2) Date: Nov. 14, 2018

(87) PCT Pub. No.: WO2019/062095
PCT Pub. Date: Apr. 4, 2019

(65) Prior Publication Data
US 2021/0232264 A1  Jul. 29, 2021

(30) Foreign Application Priority Data
Sep. 28, 2017  (CN) .......................... 201710900787.0

(51) Int. Cl.
*G06F 3/044*  (2006.01)
*G06F 3/041*  (2006.01)

(52) U.S. Cl.
CPC .......... *G06F 3/0446* (2019.05); *G06F 3/0416* (2013.01); *G06F 2203/04103* (2013.01)

(58) Field of Classification Search
CPC ................ G06F 3/0446; G06F 3/0416; G06F 2203/04103
See application file for complete search history.

(56) References Cited

U.S. PATENT DOCUMENTS 7,391,488 B2 *  6/2008  Fujishiro .............. G02F 1/1323
                                                          349/113
9,195,081 B2 * 11/2015  Yang .................... G06F 3/0445
(Continued)

FOREIGN PATENT DOCUMENTS

CN       102937852 A     2/2013
CN       203616743 U     5/2014
(Continued)

OTHER PUBLICATIONS

Office Action dated May 18, 2020, issued in counterpart CN Application No. 201710900787.0, with English Translation. (12 pages).
(Continued)

*Primary Examiner* — Amy Onyekaba
(74) *Attorney, Agent, or Firm* — WHDA, LLP

(57) ABSTRACT

The present disclosure is related to a touch control module. The touch control module may include a plurality of touch control electrodes. At least one of the plurality of touch control electrodes may have a wire grating structure. The wire grating structure may be configured to enable light from the display panel to pass through the at least one of the plurality of touch control electrodes.

15 Claims, 6 Drawing Sheets

(56) References Cited

U.S. PATENT DOCUMENTS

| | | | |
|---|---|---|---|
| 9,472,157 B2* | 10/2016 | Shima | G09G 3/3607 |
| 9,508,293 B2* | 11/2016 | Shima | H04N 13/359 |
| 9,864,476 B2* | 1/2018 | Yang | G06F 3/0412 |
| 2002/0135718 A1* | 9/2002 | Jang | G02B 6/0065 349/113 |
| 2012/0043140 A1 | 2/2012 | Peterson et al. | |
| 2012/0262412 A1* | 10/2012 | Guard | G06F 3/0446 345/174 |
| 2013/0242235 A1* | 9/2013 | Wei | G02B 5/18 349/96 |
| 2014/0063385 A1* | 3/2014 | Yang | G06F 3/0412 349/15 |
| 2014/0111473 A1 | 4/2014 | Yang et al. | |
| 2014/0292710 A1* | 10/2014 | Koito | G06F 3/04166 345/174 |
| 2014/0293159 A1* | 10/2014 | Adachi | G06F 3/0412 349/12 |
| 2014/0374763 A1* | 12/2014 | Zhou | G06F 3/0412 257/72 |
| 2015/0022735 A1* | 1/2015 | Hsu | G06F 3/0448 349/12 |
| 2015/0070478 A1* | 3/2015 | Wei | H04N 13/317 348/60 |
| 2015/0109549 A1* | 4/2015 | Gong | G02B 30/29 349/15 |
| 2015/0177867 A1 | 6/2015 | Chung et al. | |
| 2015/0277639 A1* | 10/2015 | Li | G02B 30/27 345/173 |
| 2015/0355510 A1* | 12/2015 | Kurasawa | G06F 3/0443 349/12 |
| 2015/0355751 A1* | 12/2015 | Kurasawa | G06F 3/04164 345/174 |
| 2015/0378484 A1* | 12/2015 | Orita | G09G 3/03 345/174 |
| 2016/0062209 A1* | 3/2016 | Lin | G02F 1/292 349/143 |
| 2016/0124562 A1* | 5/2016 | Lu | G06F 3/0443 345/174 |
| 2016/0179262 A1* | 6/2016 | Li | G06F 3/0412 345/174 |
| 2016/0253013 A1* | 9/2016 | Yang | G02F 1/133528 345/173 |
| 2016/0274703 A1* | 9/2016 | Satou | G06F 3/0445 |
| 2016/0299627 A1* | 10/2016 | Yang | G06F 3/0443 |
| 2016/0342256 A1* | 11/2016 | Zhou | G06F 3/0412 |
| 2016/0349888 A1* | 12/2016 | Huang | G06F 3/041 |
| 2016/0373716 A1* | 12/2016 | Lu | H04N 13/122 |
| 2016/0377939 A1* | 12/2016 | Yang | G02F 1/292 345/174 |
| 2017/0017086 A1* | 1/2017 | Wei | G02B 27/0025 |
| 2017/0023817 A1* | 1/2017 | Hayashi | G02F 1/133528 |
| 2017/0038638 A1* | 2/2017 | Park | H01L 51/5281 |
| 2017/0038649 A1* | 2/2017 | Lu | G02B 30/31 |
| 2017/0220184 A1* | 8/2017 | Liu | G06F 3/0446 |
| 2017/0343866 A1* | 11/2017 | Nam | G02F 1/1336 |
| 2017/0371202 A1* | 12/2017 | He | G02F 1/133528 |
| 2018/0067578 A1* | 3/2018 | Konoshita | G06F 3/0412 |
| 2018/0157360 A1 | 6/2018 | Gao et al. | |
| 2018/0165494 A1* | 6/2018 | Kim | G06F 3/044 |
| 2018/0210588 A1 | 7/2018 | Guo et al. | |
| 2018/0267355 A1* | 9/2018 | Li | G02F 1/133512 |
| 2019/0026527 A1* | 1/2019 | He | G06K 9/0004 |
| 2019/0042035 A1* | 2/2019 | Kim | G06K 9/0002 |
| 2019/0050096 A1* | 2/2019 | Wang | H01L 51/5253 |
| 2019/0391679 A1* | 12/2019 | Chang | G06F 3/041 |

FOREIGN PATENT DOCUMENTS

| | | |
|---|---|---|
| CN | 103926724 A | 7/2014 |
| CN | 204066077 U | 12/2014 |
| CN | 105652504 A | 6/2016 |
| CN | 106445247 A | 2/2017 |
| CN | 106648219 A | 5/2017 |
| CN | 106855757 A | 6/2017 |
| CN | 106855767 A | 6/2017 |

OTHER PUBLICATIONS

Office Action dated Dec. 3, 2019, issued in counterpart CN application No. 201710900787.0, with English translation. (14 pages).

International Search Report dated Jul. 27, 2018, issued in counterpart application No. PCT/CN2018/084239. (9 pages).

Extended (Supplementary) European Search Report dated May 14, 2021, issued in counterpart EP application No. 18826165.5. (7 pages).

* cited by examiner

Prior Art

After Superimposing

TOUCH CONTROL MODULE AND FABRICATING METHOD THEREOF AND TOUCH CONTROL DISPLAY APPARATUS

CROSS-REFERENCE TO RELATED APPLICATIONS

This application claims benefit, of the filing date of Chinese Patent Application No. 201710900787.0 filed on Sep. 28, 2017, the disclosure of which is hereby incorporated in its entirety by reference.

TECHNICAL FIELD

This invention relates to a display technology, and more particularly, to a touch control module and a fabricating method thereof and a touch control display apparatus.

BACKGROUND

With development of smart product technology, the requirement for display has gradually increased. Meanwhile, development of touch control technology is also improved. For a One Glass Solution (OGS) touch control display module which is an integrated touch control module or an On-Cell touch control display module in which touch control electrodes are arranged on a glass substrate of a display panel, as shown in FIG. 1, touch control electrodes usually adopt a grid structure 1. The grid structure 1 of the touch control electrodes overlaps a black matrix grid 2 of a display panel located below the grid structure 1. As such, a phenomenon of moiré patterns can be generated due to superimposing shielding effect of the touch control electrodes and that of the black matrix grid, thereby causing great adverse impact on the display effect.

In order to reduce the adverse impact of the moiré patterns on the display effect, in the prior art, process parameters such as angle and width of the electrode wires and intersecting angle between the electrode wires of the touch control electrodes are often adjusted to reduce the moiré patterns. However, this approach requires heavy workload and difficult process adjustment, thereby resulting in high labor cost.

BRIEF SUMMARY

Accordingly, one example of the present disclosure is a touch control module. The touch control module may include a plurality of touch control electrodes. At least one of the plurality of touch control electrodes may have a wire grating structure. The wire grating structure may be configured to enable light from the display panel to pass through the at least one of the plurality of touch control electrodes.

The wire grating structure may include a plurality of electrode wires arranged in parallel and slits between two adjacent electrode wires. A period of the wire grating structure may be in a range of about 380 nm to about 780 nm. The wire grating structure may be distributed covering a whole touch control electrode or a part of the touch control electrode.

The touch control electrodes may include strip-shaped touch control driving electrodes and strip-shaped touch control sensing electrodes crossing each other to form a grid structure. A width of each of the slits in the strip-shaped touch control driving electrodes may be substantially the same as a width of each of the slits in the ship-shaped touch control sensing electrodes. An extension direction of each of the slits in the strip-shaped touch control driving electrodes may be substantially the same as an extension direction of each of the slits in the strip-shaped touch control sensing electrodes. In one embodiment, the strip-shaped touch control driving electrodes and the strip-Shaped touch control sensing electrodes may be arranged in a same layer. In another embodiment, the ship-shaped touch control driving electrodes and the strip-shaped touch control sensing electrodes may be arranged in different layers. The touch control electrodes may be made of metal or ITO. The touch control module may be an ON-cell touch control display module or an OGS touch control display module.

Another example of the present disclosure is a touch display apparatus. The touch display apparatus may include a touch control module according to one embodiment of the present disclosure. The touch display apparatus may further include a display panel. In one embodiment, the display panel may include a first polarizer, a liquid crystal layer, and a second polarizer arranged in a light exiting direction sequentially, and a length direction of the electrode wires may be perpendicular to a polarization direction of the second polarizer. In another embodiment, the display panel may include an OLED light-emitting layer and a polarizer arranged in a light exiting direction sequentially, and a length direction of the electrode wires may be perpendicular to a polarization direction of the polarizer.

Another example of the present disclosure is a method of fabricating a touch control module. The method of fabricating a touch control module may include forming a plurality of touch control electrodes and forming a wire grating structure in at least one of the plurality of the touch, control electrodes. The wire grating structure may be configured to enable light from the display panel to pass through the at least one of the plurality of touch control electrodes. The wire grating structure may be fabricated by a nano-imprinting method.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
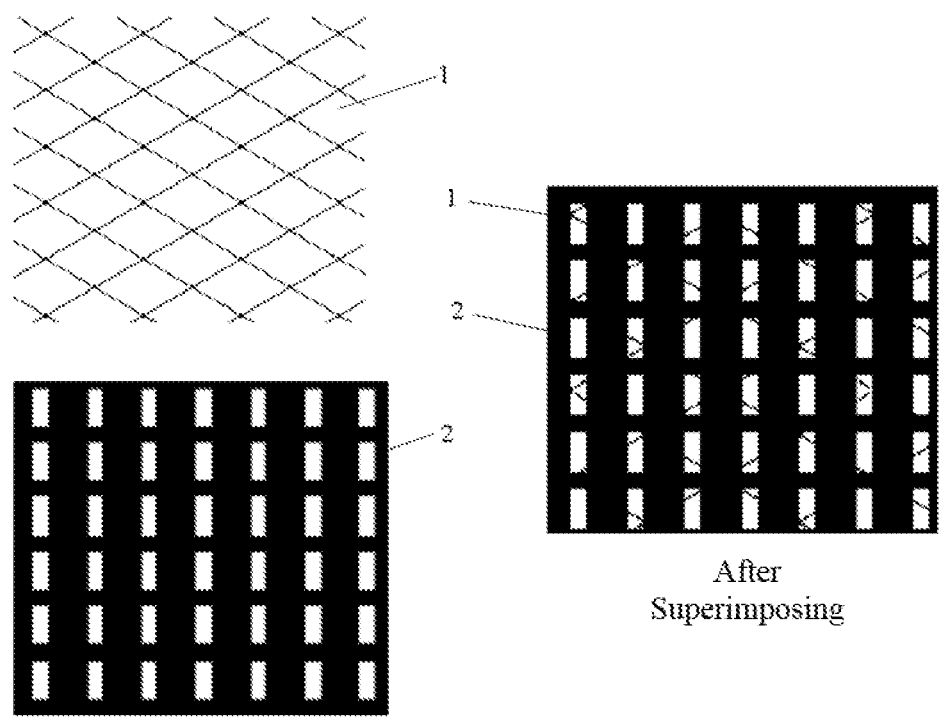
FIG. 1 is a superimposed view of grid structures of the touch control electrodes and the black matrix grid of the display panel.

The present disclosure Will be described in further detail with reference to the accompanying drawings and embodiments in order to provide a better understanding by those skilled in the art of the technical solutions of the present disclosure. Throughout the description of the disclosure, reference is made to FIGS. 1-6. When referring to the figures, like structures and elements shown throughout are indicated with like reference numerals.

Although relative terms such as "above" and "below" are used in this specification to describe relative relationship of one component of a figure to another, these terms are used herein for convenience only, e.g., according to the direction exemplified in the drawings. It should be understood that if a device in a figure is flipped so it is upside down, the component described as "above" will become the component as "below."

A touch control display module is provided according to one embodiment of the present disclosure. The touch control display module includes a display panel having a light shielding structure and a plurality of touch control electrodes above the display panel. A wire grating structure is arranged in at least one of the plurality of touch control electrodes. The wire grating structure is used for enabling light from the display panel to pass through the at least one of the plurality of the touch control electrodes.

In the prior art, moiré pattern is usually produced due to superposition of the shielding effect of the fight shielding structure and the shielding effect of the touch control electrodes, thereby causing significant adverse impact on the display effect. In one embodiment of the present disclosure, a wire grating structure is formed in at least one of the plurality of the touch control electrodes to eliminate the shielding effect of the touch control electrodes, thereby eliminating the condition for generating moiré patterns. As a result, moiré pattern phenomena is reduced or even eliminated. Meanwhile, because the scheme is relatively simple compared with the prior art, the labor cost is greatly reduced accordingly.

The light shielding structure may be a black matrix, gate lines or data lines having a shielding effect or the like, which is not limited in this embodiment of the present disclosure.

Figure 2A:
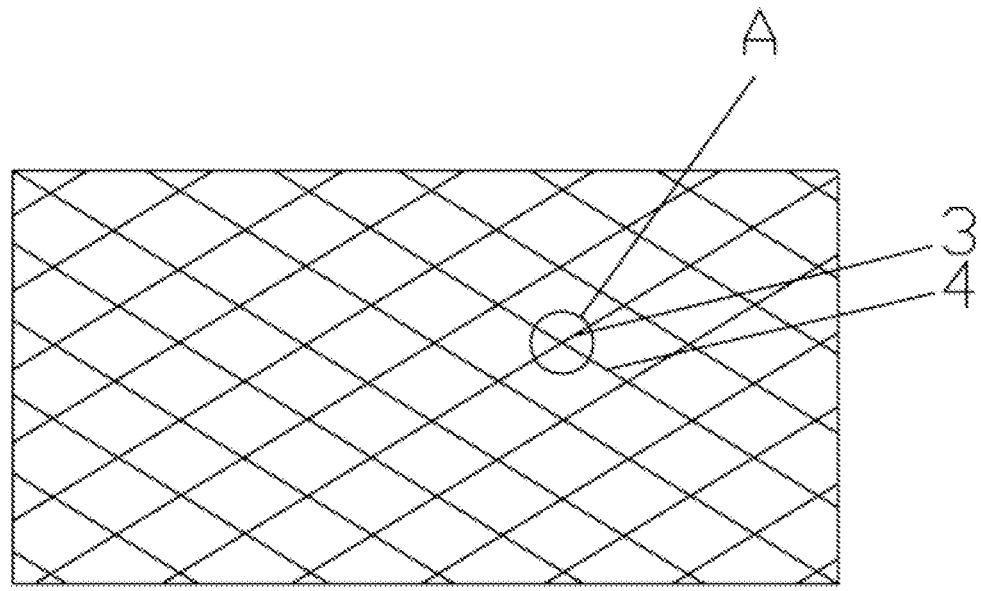
FIG. 2A is a structural diagram of touch control electrodes of a touch control display module according to an embodiment of the present disclosure.
Figure 2B:
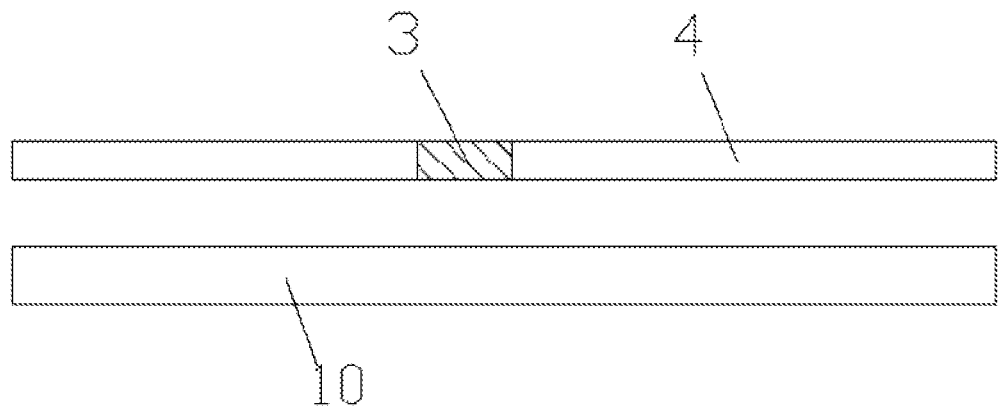
FIG. 2B is a partial cross-sectional view of a touch control driving electrode and a touch control sensing electrode arranged in a same layer according to an embodiment of the present disclosure.
Figure 3:
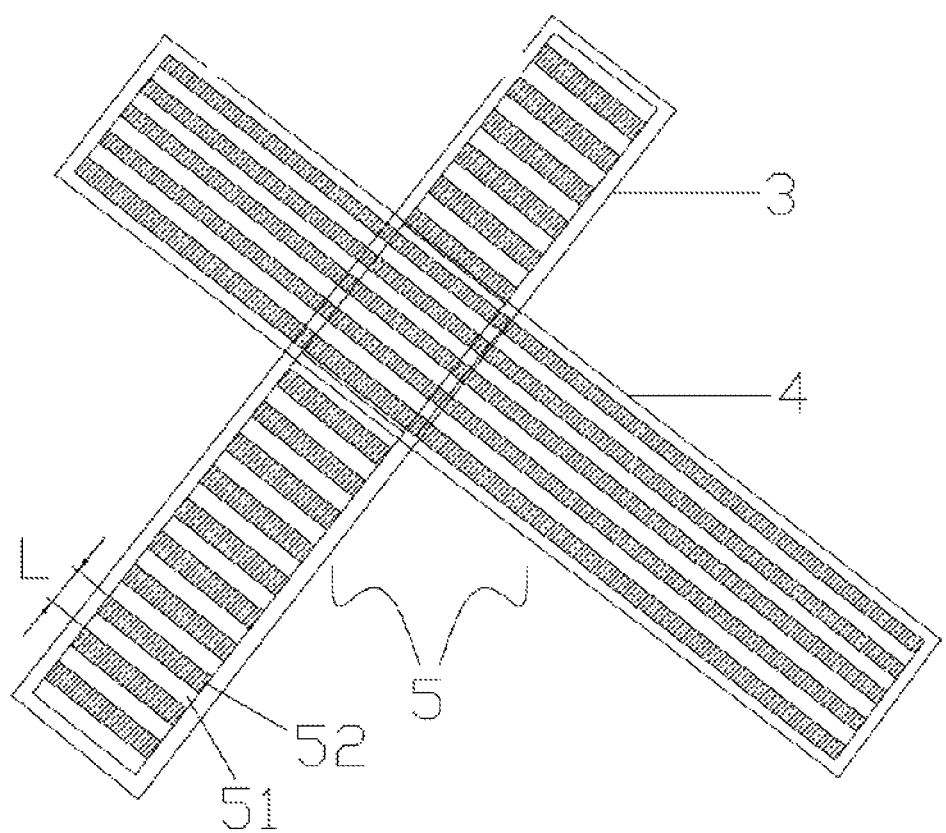
FIG. 3 is an enlarged view of an area A in FIG. 2A.

A touch control display module according to one embodiment of the present disclosure is described in detail below. As shown in FIG. 2A, FIG. 2B, and FIG. 3, the touch control display module comprises a display panel 10 and a plurality of touch control electrodes arranged above the display panel 10. The touch control electrodes comprise touch control driving electrodes 3 and touch control sensing electrodes 4. The touch control driving electrodes 3 and the touch control sensing electrodes 4 are located in the same layer and each of the touch control driving electrodes 3 and the touch control sensing electrodes 4 is of a strip shape. Also, the touch control driving electrodes 3 and the touch control sensing electrodes 4 cross each other to form a grid structure. Furthermore, a wire grating structure 5 is formed in at least one of the plurality of the touch control driving electrodes 3 and/or the touch control sensing electrodes 4. The wire grating structure 5 is used for enabling light from the display panel 10 to pass through the touch control driving electrodes 3 and/or the touch control sensing electrodes 4.

Due to the wire grating structure 5, the shielding effect of the touch control electrodes is eliminated so that the condition for generating moiré patterns is eliminated. As a result, moiré patterns are reduced or even eliminated. Meanwhile, since the scheme is simple compared with the prior art, the labor cost is greatly reduced.

In one embodiment, as shown in FIG. 3, a wire grating structure 5 is arranged in both the touch control driving electrodes 3 and the touch control sensing electrodes 4 respectively. In one embodiment, a width of each of the slits in the ship-shaped touch control driving electrodes is substantially the same as a width of each of the slits in the strip-shaped touch control sensing electrodes. An extension direction of each of the slits in the strip-shaped touch control driving electrodes is substantially the same as an extension direction of each of the slits in the strip-shaped touch control sensing electrodes. However, in practical application according to specific needs, for example, severity of moiré pattern at different positions, the wire grating structure 5 may be only formed in the touch control driving electrodes 3 or the touch control sensing electrodes 4.

Specifically, in one embodiment, the wire grating structure 5 comprises a plurality of electrode wires 51 arranged in parallel and slits 52 between two adjacent electrode wires 51. Due to the wire grating structure 5, light from the display panel 10 can pass through the touch control electrodes so that the shielding effect of the touch control electrodes is eliminated. In addition, it is convenient to manufacture the slit structure by a nano-imprinting method. The nano-imprinting method has advantages such as high yield, low cost, and simple process.

In one embodiment, the length direction of the plurality of the electrode wires 51 in the touch control driving electrode 3 is perpendicular to the extending direction of the touch control driving electrode 3. Furthermore, the length direction of the plurality of electrode wires 51 in the touch control sensing electrode 4 is parallel to the extending direction of the touch control sensing electrode 4. As such, the manufacture process is simplified. However, the disclosure is not limited thereto. In practical applications, the length direction of the plurality of electrode wires 51 can be freely set according to specific situations.

In one embodiment, the wire grating structure is distributed covering the whole touch control electrode so that light can pass through the whole touch control electrode, thereby increasing area of light transmission to the largest extent. In practical applications, according to specific needs, for example, severity of moiré pattern at different positions, the wire grating structure 5 may be distributed only in a part of the touch control electrode.

Figure 4:
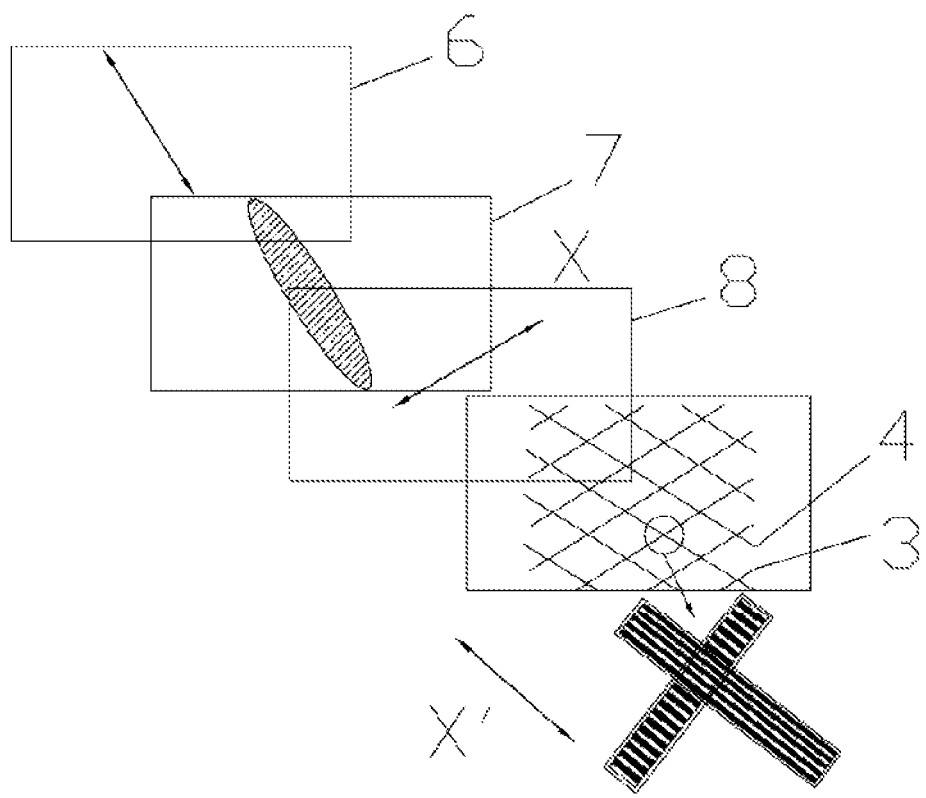
FIG. 4 is a structural diagram of a touch control display module according to an embodiment of the present disclosure.
Figure 5:
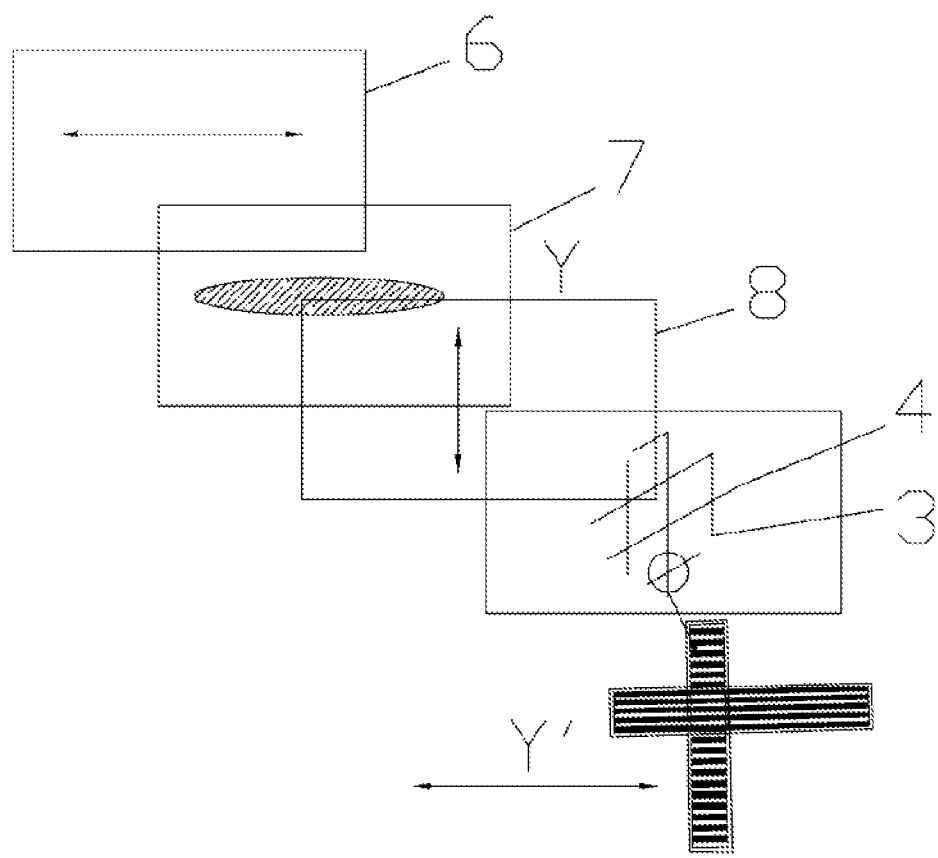
FIG. 5 is a structural diagram of a touch control display module according embodiment of the present disclosure.

In one embodiment, as shown in FIG. 4 and FIG. 5, the display panel comprises a first polarizer 6, a liquid crystal 7, and a second polarizer 8 arranged in the light exiting direction sequentially. The length direction of the electrode wires 51 is perpendicular to the polarization direction of the second polarizer 8 so that the polarized light emitted from the second polarizer 8 can be guaranteed to smoothly pass through the slits 52. FIG. 4 and FIG. 5 show two polarization directions of the second polarizer 8, X and Y, respectively under the long black state, and the length direction of the electrode wires 51 is always perpendicular to the polarization direction of the second polarizer 8. Specifically, as shown in FIG. 4, the polarization direction of the second polarizer 8 is X, and the length direction of the electrode wires 51 is X'. The direction X and the direction X' are perpendicular to each other. As shown in FIG. 5, the polarization direction of the second polarizer 8 is Y, and the length direction of the electrode wires 51 is Y'. The direction and the direction Y' are perpendicular to each other.

In one embodiment, the extending direction of each of the touch control electrodes can be arbitrarily set according to specific needs. The length direction of the electrode wires 51 is set according to the polarization direction of the second polarizer 8.

In the above embodiment, the display panel is a liquid crystal display panel. In another embodiment, the display panel is an OLED display panel. The display panel generally comprises an OLED light-emitting layer and a polarizer, which are sequentially arranged in the light-exiting direction. The length direction of the electrode wires 51 is perpendicular to the linear polarization direction of the polarizer. In one embodiment, the polarizer used by the OLED display panel is a circular polarizer. The circular polarizer is formed by gluing a linear polarizer with a quarter-wave plate, which is made of a special double refraction material. The length direction of the electrode wires 51 is perpendicular to the polarization direction of the linear polarizer.

As shown in FIG. 3, a sum of widths of an electrode wire 51 and a slit 52 adjacent to the electrode wire 51 is one period L of the wire grating structure 5. In one embodiment, the period L is in a range of about 380-780 nm. As such, natural light can be better filtered.

Figure 6:
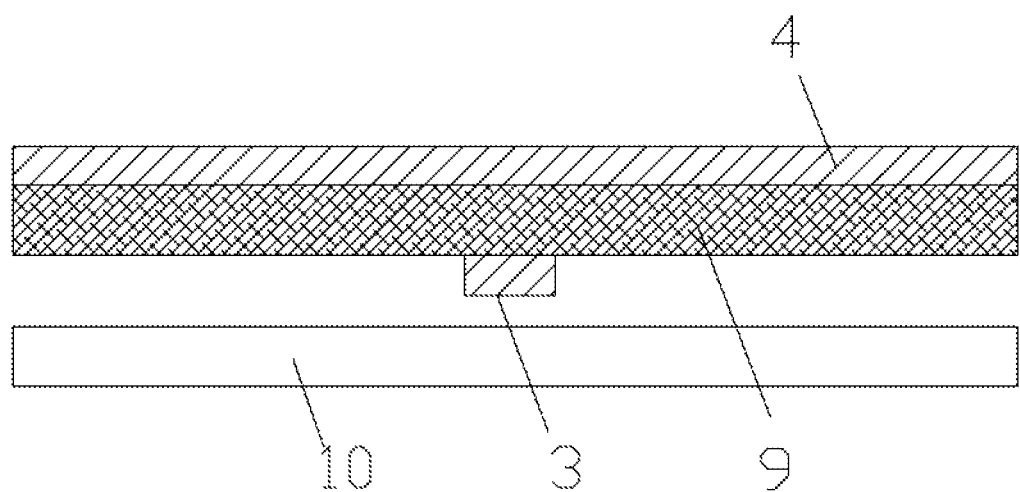
FIG. 6 is a partial cross-sectional view of a touch control driving electrode and, a touch control sensing electrode arranged in different layers according to an embodiment of the present disclosure.

In one embodiment, as shown in FIG. 2B, the touch control driving electrodes 3 and the touch control sensing electrodes 4 are arranged in the same layer. The present disclosure is not limited thereto. As shown in FIG. 6, the touch control driving electrodes 3 and the touch control sensing electrodes 4 may also be arranged in different layers and separated from each other by an insulating layer 9. Similarly, the touch control driving electrodes 3 of the strip-shape and the touch control sensing electrodes 4 of the strip-shape cross each other to form a grid structure. The touch control electrode provided with the wire grating structure 5 may be a touch control driving electrode 3 and/or a touch control sensing electrode 4.

In one embodiment, the touch control electrode may be a linear electrode. The touch control driving electrodes 3 and the touch control sensing electrodes 4 cross each other to form a grid structure. However, the present disclosure is not limited thereto. In practical application, the touch control electrode can also have other structures. For example, the touch control electrode may be, a folded line electrode and the like. In one embodiment, the touch control driving electrodes 3 and the touch control sensing electrodes 4 can be arranged in parallel.

In one embodiment, the touch control electrodes may be made of metal or ITO.

In one embodiment, the touch control display module provided by an embodiment of the present disclosure may be an On-Cell touch control display module or an OGS touch control display module.

In conclusion, a touch control display module is provided by one embodiment of the present disclosure. A wire grating structure is formed in at least one of the touch control electrodes. The wire grating structure is used for enabling light from the display panel to pass through the touch control electrodes so that the shielding effect of the touch control electrodes is eliminated, thereby eliminating the condition for generating moiré patterns. As a result, the moiré patterns are reduced or even eliminated. Meanwhile, compared with the prior art, the scheme is simple and the labor cost is greatly reduced.

A method of fabricating a touch control display module is provided according to one embodiment of the present disclosure. The method includes the following:

A display panel is first formed. Then, a plurality of touch control electrodes are formed above the display panel. Then, a wire grating structure is formed in at least one of the touch control electrodes. The wire grating structure may be used for enabling light from the display panel to pass through the touch control electrodes.

In one embodiment, a wire grating structure is formed in at least one of the touch control electrodes. The wire grating structure is used for enabling light from the display panel to pass through the touch control electrodes so that the shielding effect of the touch control electrodes is eliminated, thereby eliminating the condition for generating moiré patterns. As such the moiré patterns are reduced or even eliminated. Meanwhile, compared with the prior art, the scheme is simple and the labor cost is greatly reduced.

In one embodiment, the wire grating structure is manufactured by a nano-imprinting method. The nano-imprinting method has advantages such as high yield, low cost, and simple process.

A touch control display apparatus is also provided according to one embodiment of the present disclosure. The touch control display apparatus comprises the touch control display module provided by one embodiment of the present disclosure.

By adopting the touch control display module provided by the embodiment of the disclosure, the touch control display apparatus can not only reduce or even eliminate moiré patterns, but also reduce labor cost because of simple scheme.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A touch control module, comprising:
   a plurality of touch control electrodes;
   wherein each of the plurality of touch control electrodes has a wire grating structure, and the wire grating structure comprises a plurality of electrode wires arranged in parallel and slits between two adjacent electrode wires;
   the touch control electrodes comprise strip-shaped touch control driving electrodes and strip-shaped touch control sensing electrodes crossing each other to form a grid structure;
   the plurality of electrode wires in the strip-shaped touch control driving electrodes and the strip-shaped touch control sensing electrodes are arranged along a same length direction; and
   the wire grating structure is configured to enable light from the display panel to pass through the plurality of touch control electrodes.

2. The touch control module according to claim 1, wherein the plurality of electrode wires in each of the plurality of touch control electrodes are electrically connected.

3. The touch control module according to claim 1, wherein a period of the wire grating structure is in a range of about 380 nm to about 780 nm.

4. The touch control module according to claim 1, wherein the wire grating structure is distributed covering a whole touch control electrode or a part of the touch control electrode.

5. The touch control module according to claim 1, wherein a width of each of the slits in the strip-shaped touch control driving electrodes is substantially the same as a width of each of the slits in the strip-shaped touch control sensing electrodes.

6. The touch control module according to claim 1, wherein an extension direction of each of the slits in the strip-shaped touch control driving electrodes is substantially the same as an extension direction of each of the slits in the strip-shaped touch control sensing electrodes.

7. The touch control module according to claim 6, wherein the strip-shaped touch control driving electrodes and the strip-shaped touch control sensing electrodes are arranged in a same layer.

8. The touch control module according to claim 6, wherein the strip-shaped touch control driving electrodes and the strip-shaped touch control sensing electrodes are arranged in different layers.

9. The touch control module according to claim 1, wherein the touch control electrodes are made of metal or ITO.

10. The touch control module according to claim 1, wherein the touch control module is an ON-cell touch control display module or a One Glass Solution (OGS) touch control display module.

11. A touch display apparatus comprising the touch control module according to claim 1.

12. The touch display apparatus according to claim 11, further comprising a display panel, wherein the display panel comprises a first polarizer, a liquid crystal layer, and a second polarizer arranged in a light exiting direction sequentially, and a length direction of the electrode wires is perpendicular to a polarization direction of the second polarizer.

13. The touch display apparatus according to claim 11, further comprising a display panel, wherein the display panel comprises an OLED light-emitting layer and a polarizer arranged in a light exiting direction sequentially, and a length direction of the electrode wires is perpendicular to a polarization direction of the polarizer.

14. A method of fabricating a touch control module, comprising:
    forming a plurality of touch control electrodes; and
    forming a wire grating structure in the plurality of the touch control electrodes,
    wherein each of the plurality of touch control electrodes has a wire grating structure, and the wire grating structure comprises a plurality of electrode wires arranged in parallel and slits between two adjacent electrode wires;
    the touch control electrodes comprise strip-shaped touch control driving electrodes and strip-shaped touch control sensing electrodes crossing each other to form a grid structure;
    the plurality of electrode wires in the strip-shaped touch control driving electrodes and the strip-shaped touch control sensing electrodes are arranged along a same length direction; and
    the wire grating structure is configured to enable light from the display panel to pass through the plurality of touch control electrodes.

15. The method according to claim 14, wherein the wire grating structure is fabricated by a nano-imprinting method.

* * * * *